Jan. 15, 1957  H. D. PICKETT ET AL  2,777,703
CAM ACTUATED COLLET
Filed Jan. 25, 1955
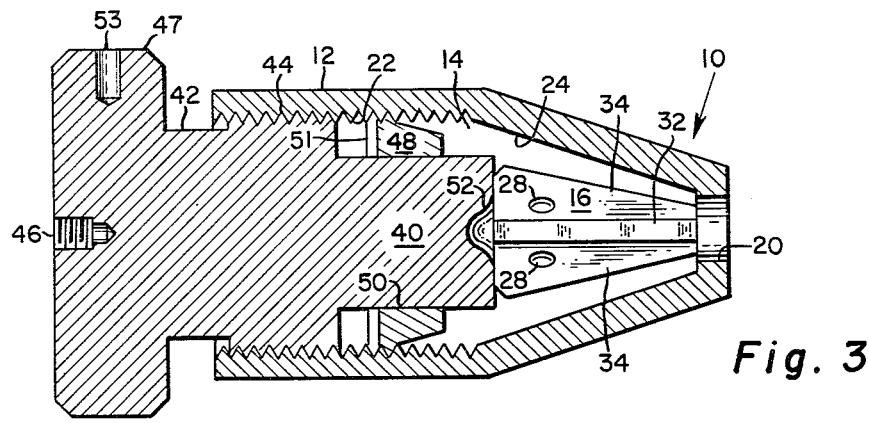
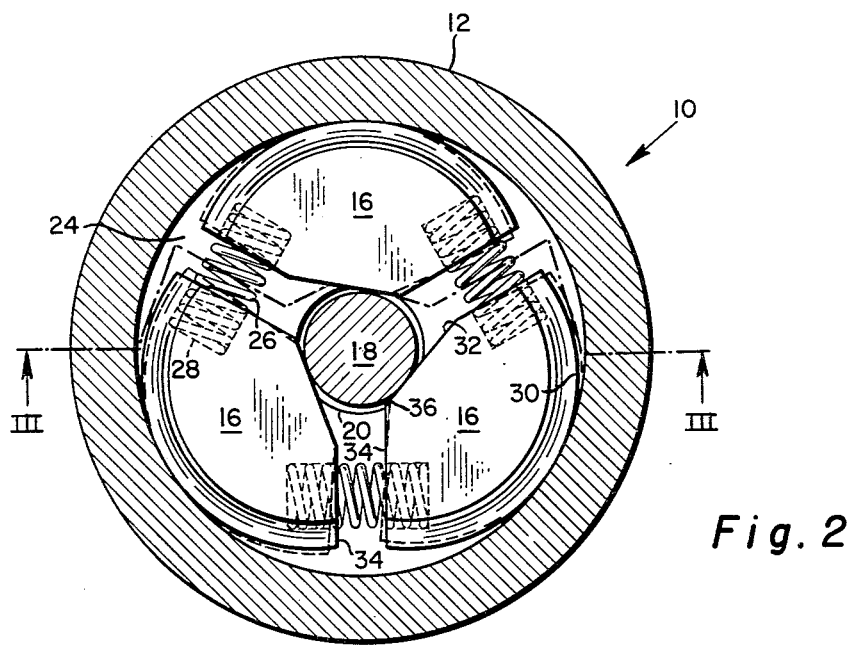
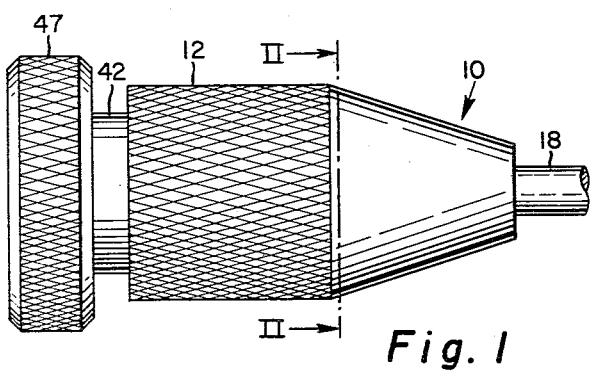
INVENTORS
HAROLD D. PICKETT
LAWRENCE BECKWITH SR.
BY
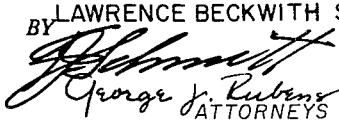
ATTORNEYS United States Patent Office 2,777,703
Patented Jan. 15, 1957

2,777,703

CAM ACTUATED COLLET

Harold D. Pickett and Lawrence Beckwith, Sr., San Diego, Calif.

Application January 25, 1955, Serial No. 484,089

5 Claims. (Cl. 279—56)

(Granted under Title 35, U. S. Code (1952), sec. 266)

The invention described herein may be manufactured and used by or for the Government of the United States of America for governmental purposes without the payment of any royalties thereon or therefor.

This invention relates to collets and more particularly to collets which utilize a cam action to grip the object to be supported, such as a shaft or tool shank.

Most conventional collets for supporting drills, sometimes referred to as drill chucks, rely on serrated jaws which securely grip the drill shank. In some of these collets, a key and ratchet construction on the chuck sleeve are provided to assist the operator in manually exerting the necessary clamping force.

An inherent disadvantage of these constructions is that the drill shanks are damaged by the jaw indentation. The indentations also encourage slippage between the jaws and tool and results in severe scoring. Damage of this type may reduce the life of the tools more than the actual drilling operation and represents a substantial tool replacement cost. Furthermore, these collets have a tendency to jam making drill release difficult.

According to the present invention a collet is provided with a sleeve having a cavity that houses a plurality of circumferentially spaced jaws between which is received an object, such as a drill shank, to be supported. Each jaw is formed with an outer peripheral surface capable of rocking on the inner cavity wall and an inner opposite lateral surface adapted to engage and wedge the object between the other jaws when the jaws are rotated. In the preferred embodiment the cavity is cylindrical and each outer jaw surface is curved having a smaller radius than the radius of the cavity to permit the rocking action. The inner tool-engaging surfaces of the jaws can be made flat to avoid scoring the peripheral surfaces of the object since sufficient clamping force is applied by the cam action. To permit adjustment of the collet for various sizes of drill shanks, that portion of the cavity housing the jaws is conical and the jaws correspondingly tapered and longitudinally positionable to vary the jaw opening. The sleeve is provided with a suitable spindle connection which can be a central plunger having at the free end a centering recess to align the drill shank within the sleeve, the plunger also serving to form an abutment for the inner ends of the jaws.

While prior art collets have been provided with a cam action, they could not be easily tightened and released nor did they offer a savings in increased tool life, simplicity in construction and operation, as well as other advantages of the present invention.

A primary object of this invention is to provide a collet capable of being tightened and released with a minimum of effort.

Another object is to provide a collet which will not score or otherwise damage the object supported whether it be a tool, shaft or the like.

Further objects are to provide a collet which is self-tightening; to provide a drill chuck having a drill aligning means; and to provide a collet which is simple in construction and inexpensive to manufacture.

Other objects and many of the attendant advantages of this invention will be readily appreciated as the same becomes better understood by reference to the following detailed description when considered in connection with the accompanying drawings wherein:

Fig. 1 is a side elevation of a collet employed as a drill chuck;

Fig. 2 is an enlarged cross-section of the collet of Fig. 1 taken along line II—II; and Fig. 3 is a longitudinal section of the collet of Fig. 2 taken along line III—III, with the drill removed to show the details of the jaw.

Referring now to the drawing, wherein like reference characters designate like or corresponding parts throughout the several views, there is shown generally a collet employed as a drill chuck 10 comprising an outer knurled sleeve 12 having a cavity or bore 14 adapted to house a plurality of circumferentially spaced jaws 16 for clamping a tool shank 18 or the like that is inserted through an open sleeve end 20. In the preferred embodiment the bore has a circular cross-section, and is formed with a cylindrical bore portion 22 and a conical bore portion 24, the conical portion enabling the jaws to be longitudinally adjusted to accommodate a prescribed range of drill sizes.

Jaws 16 are positioned in conical bore portion 24 and are tapered to conform generally to the conical surface although smaller in length to permit radial expansion. The jaws are resiliently maintained in spaced relation, such as by coil tension springs 26, the opposite ends of each spring being secured in sockets 28 formed in adjacent jaw surfaces.

The jaw assembly consists of preferably three jaws 16, and, since each jaw can be identical a description of one will suffice for all. Each jaw 16 is provided with an outer lateral surface 30 adapted to rock on the tapered bore surface for a purpose to be described, and, preferably being curved, having a radius less than the radius of the conical bore at any particular point of contact to ensure a rocking or rolling movement. An inner opposite lateral surface 32 of each jaw is adapted to engage the round tool shank, and is preferably flat to avoid scoring the surface of the shank. Tool engaging surface 32 is preferably cut at a bias with respect to the opposite jaw sides 34 to effect a cam action to clamp the drill shank therebetween when the jaws are rocked in a tightening direction. It has been found that the angle of cut or bias of cam surface 32 of about 10 degrees with respect to one side will function satisfactory, the high side 36 of the cam surface being on the driving side of the jaw during tightening. It is obvious that the side 34 of each jaw at the high side of cam surface 32 will be longer than the opposite side. The length of cam surface 32 will also determine the smallest size of drill that can be accommodated. It should be noted that the jaws are formed in cross-section as sectors with adjacent sides 34 spaced sufficiently apart at any longitudinal position in conical bore position 24 to allow the rocking action.

Jaws 16 are backed-up in the chuck by an inner end 40 of a plunger 42 threadedly connected at 44 within the cylindrical portion 22 of the sleeve, the plunger being tapped at 46 on the outer knurled knob end 47 for connection to a drill spindle, not shown. A bushing 48 also threaded within bore portion 22 is provided with a smooth central opening 50 for guiding and aligning plunger end 40 to maintain the sleeve and jaws true with the spindle. A pair of slots 51 formed on the outer end of bushing 48 to enable the latter to be inserted within bore portion 22 and adjusted to the desired longitudinal position. The inner end face of plunger 42 is formed with a central depression 52 which functions as a self-centering seat for the drill shank. The removal of the chuck from the drill spindle is facilitated by provision of a hole 53 drilled into knob 47 to receive a rod or the like whereby additional torque may be applied.

The operation of the drill chuck can best be described with reference to Fig. 2, which shows drill shank 18 inserted between jaws 16 and initially clamped by cam surfaces 32 through the action of springs 26. The threading of plunger 42 into the sleeve applies a radial thrust by wedging the tapered jaws between the conical bore portion 24 and the drill shank.

When a load is applied to the drill by engagement with a work piece, jaws 16 are rocked clockwise on the conical bore surface from the solid-line position to the broken-line position causing the drill shank to ride up the flat cam surfaces 32 toward the high points 36, and the jaws in unison apply a radial thrust or pressure on the drill shank which increases in proportion to the load. As the cam surfaces are flat the shanks are tightly clamped without damage by scoring. To release the tool shank, jaws 16 can be easily rocked back to the initial solid-line position where the drill shank rides down on cam surfaces 32 and the radial pressure on the drill shank is removed.

The collet of this invention enables a drill to be tightened and released easily and quickly without the assistance of tools. The clamping surfaces of the jaws are smooth and cannot score the tool shanks greatly lengthening tool-life and reducing tool replacement. While the collet illustrated is used as a drill chuck, the novel construction can be utilized for releasably gripping any object such as a shaft or the like.

Obviously many modifications and variations of the present invention are possible in the light of the above teachings. It is therefore to be understood that within the scope of the appended claims the invention may be practiced otherwise than as specifically described.

We claim:

1. A collet comprising a sleeve having a cavity, a plurality of circumferentially spaced jaws disposed within the cavity, means for maintaining said jaws in spaced relation, each of said jaws having an outer peripheral surface adapted to rock on the wall of the cavity and only one inner opposite lateral cam surface adapted to engage the object to be secured, each lateral cam surface being continuous throughout its engaging surface and having a high point of engagement and a low point of engagement whereby rotation of the jaws on the sleeve wall will wedge the object between said high points of the cam surfaces.

2. A collet comprising a sleeve having a cavity, a plurality of circumferentially spaced jaws disposed within the cavity, means for maintaining said jaws in spaced relation, each of said jaws having an outer curved peripheral surface adapted to rock on the wall of the cavity and only one inner opposite lateral flat cam surface adapted to engage the object to be secured, each lateral cam surface being continuous throughout its engaging surface and having a high point of engagement and a low point of engagement whereby rotation of the jaws on the sleeve wall will wedge the object between said high points of the cam surfaces.

3. A collet comprising a sleeve having a conical cavity, a plurality of circumferentially spaced tapered jaws disposed within the cavity, means for maintaining said jaws in spaced relation, each of said jaws provided with an outer curved peripheral surface having a radius smaller than the radius of the cavity to permit each jaw to rock on the wall of the cavity, each of said jaws also provided with only one inner opposite lateral flat cam surface having a bias of approximately 10 degrees with respect to one side to provide a high point of engagement and a low point of engagement adapted to engage the object to be secured, each lateral cam surface being continuous throughout its engaging length whereby rotation of the jaws on the sleeve wall will wedge the object between said high points of the cam surfaces.

4. A collet comprising a sleeve having a cylindrical cavity and a conical cavity in contiguous relation, a plurality of circumferentially spaced tapered jaws disposed within the conical cavity, an axially movable plunger mounted within the sleeve and having a centering aperture at the inner end to receive an object to be secured by said jaw, resilient means for maintaining said jaws in spaced relation, each of said jaws provided with an outer curved peripheral surface having a radius smaller than the radius of the conical cavity to permit each jaw to rock on the wall of the conical cavity, each of said jaws also provided with only one inner opposite lateral flat cam surface adapted to engage the object to be secured, each lateral cam surface being continuous throughout its engaging length and having a high point of engagement and a low point of engagement whereby rotation of the jaws on the sleeve wall will wedge the object between said high points of the cam surfaces.

5. A collet comprising a sleeve having a cylindrical cavity and a conical cavity in contiguous relation, a plurality of circumferentially spaced tapered jaws disposed within the cavity, resilient means for maintaining said jaws in spaced relation, a plunger threadedly mounted within the sleeve and having a centering depression at the inner end to align an object to be secured by said jaws, said plunger adapted to abut the inner jaw ends, a bushing threaded within said shell to receive and axially align said plunger, each of said jaws having sides and provided with an outer curved peripheral surface having a radius smaller than the radius of the conical cavity to permit each jaw to rock on the conical cavity wall, each of said jaws also provided with only one inner opposite lateral flat cam surface adapted to engage the object to be secured, one side of each jaw being longer than the other side to provide a high point of engagement and a low point of engagement whereby rotation of the jaws on the sleeve wall will wedge the object between said high points of the cam surfaces.

References Cited in the file of this patent

UNITED STATES PATENTS

| | | |
|---|---|---|
| 1,766,174 | Hobbs et al. | June 24, 1930 |
| 2,535,106 | Vidal | Dec. 26, 1950 |
| 2,591,287 | Pellar et al. | Apr. 1, 1952 |